United States Patent Office 3,480,838
Patented Nov. 25, 1969

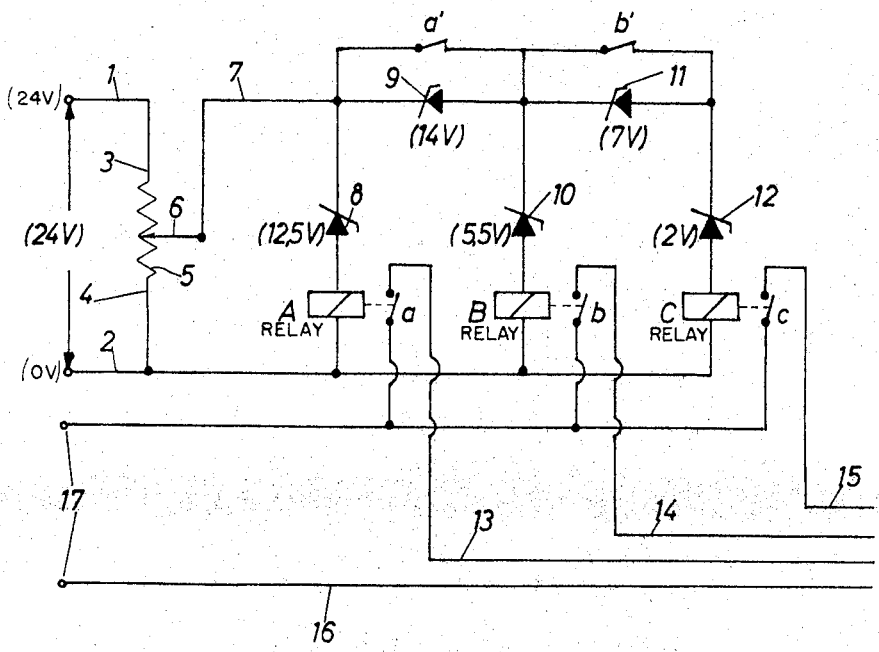

3,480,838
ELECTROPNEUMATIC BRAKING
CONTROL SYSTEM
Franz Meir, Weilheim, Germany, assignor to Knorr-Bremse, Munich, Germany, a limited-liability corporation
Filed Aug. 28, 1967, Ser. No. 663,703
Claims priority, application Germany, Aug. 31, 1966, K 6,014
Int. Cl. H01h 47/32
U.S. Cl. 317—137                                3 Claims

ABSTRACT OF THE DISCLOSURE

A control system having a potentiometer with a constant voltage difference between its end terminals and having a movable contact connected to one of a number of intermediate circuits corresponding in number to the control circuits with each control circuit actuating a brake operator to establish various combinations of brake settings. The intermediate circuits each comprise a relay connected in series with progressively increasing number of Zener diodes and the voltage levels of the diodes decreasing from the movable contact.

---

The present invention relates to a control system for electropneumatic braking of railway vehicles, more particularly, to such a system for selectively connecting control circuits for the brakes to a voltage source in such a manner that each combination of circuits will result in a particular brake setting.

Such control systems generally comprise a plurality of control circuits with each control circuit being connected to a brake operator. A switching arrangement is provided for selectively connecting combinations of the control circuits to a voltage source in order to result in particular brake settings. The switching arrangements are manually controlled by the operator of the vehicle and may take a number of forms. In one form of switching arrangement, the control circuits are arranged in a series corresponding to a progressively increasing application of the brakes. Various mechanical devices may be employed to provide a switching from one combination to another of control circuits with a minimum of delay or overlap in successive closing of the contacts for each combination of control circuits. Such control systems generally require a large number of mechanical snap devices such as switches and electrical switching and relays. As a result, known control circuits are extremely complicated in nature and relatively expensive to construct.

In another form of control system there is employed only a single switch contact that must be engaged by the operator to change from one circuit combination to a succeeding combination. A plurality of special relays which are responsive to the closure of switch contacts by the operator are provided so that the desired combination of control circuits can always be obtained.

It is therefore the principal object of the present invention to provide a novel and improved control system for electropneumatic braking of a vehicle.

It is a further object of the present invention to provide a novel and improved switching arrangement in a control system for electropneumatic braking of a vehicle.

It is an additional object of the present invention to provide a simple and reliable switching arrangement for selectively connecting a plurality of control circuits to a voltage source.

The present invention may generally comprise three control conductors connected to a voltage source and to brake operators to actuate the operators in selected combinations to establish various brake settings. Each of the control conductors is provided with a normally open switch so that closure of the switch will energize the respective control conductor. There is a potentiometer connected across a source of constant voltage difference. The movable contact of the potentiometer is connected to a corresponding plurality of intermediate circuits each of which has a relay for actuating the respective control conductor switches. The first intermediate circuit is also provided with electro-responsive valve means, which may be in the form of a Zener diode, in series with the relay. The second intermediate circuit comprises two electro-responsive valve means connected in series with the relay therein. The third intermediate circuit comprises two electro-responsive valve means connected in series with one of the valve means of the second intermediate circuit and the relay of the third intermediate circuit. The voltage responsive levels of the valve means in the intermediate circuits decrease progressively from the low voltage end of the potentiometer so that a valve means in one intermediate circuit has a voltage level next below that of a valve means which is common to subsequent intermediate circuits. There are also provided normally closed switches responsive to the relays in the intermediate circuits closest to the potentiometer connected across the valve means common to subsequent intermediate circuits.

With this arrangement of electro-responsive valve means and relays, movement of the movable contact of the potentiometer from the low voltage end toward the high voltage end will connect various combinations of the control conductors to a voltage source to result in progressively increasing application of the brakes.

Other objects and advantages of the present invention will be apparent from the accompanying description when taken in conjunction with the drawing which illustrates schematically the electrical circuit of the present control system.

With reference to the drawing a specific embodiment of the present invention will be described in detail.

Wires 1 and 2 are connected across a constant voltage difference of 24 volts (D.C.) as shown and lead to a high voltage end 3 and a low voltage end 4 of a potentiometer 5 having a manually adjustable sliding contact 6. The movable contact 6 is connected by means of electrical conductor 7 to three intermediate circuits each of which will be described in detail and are positioned progressively increasing distances from the potentiometer.

The first intermediate circuit comprises a Zener diode 8 connected in series with the solenoid of a relay A.

The second intermediate circuit comprises a Zener diode 9 connected in series with a second Zener diode 10 and the solenoid of a relay B. The third intermediate circuit comprises the same Zener diode 9 in series with Zener diodes 11 and 12 with all of the diodes being in series with the solenoid of a relay C. The three intermediate circuits are connected by the electrical conductor 2 back to the source of zero potential as illustrated.

A plurality of brake actuating control circuits corresponding to the number of intermediate circuits and indicated at 13, 14, and 15 are connected through a common conductor 16 to a source of electircal energy indicated at 17. While not shown in the drawing, each of the control circuits 13, 14, and 15 are connected to operators for the vehicle brakes.

Each of the control circuits 13, 14, and 15 are provided with normally open relay switches a, b, and c respectively which are actuated by the respective relays A, B, and C. Energization of the relays will close the switches a, b, and c to conect the respective control circuit to the source of electrical energy.

The relay A is also provided with a normally closed relay switch a' which is connected across the Zener diode 9. In addition, relay B is provided with a normally closed relay switch b' which is connected across the Zener diode 11.

The conductors 13, 14, and 15 together with the common return lead 16 actuate the vehicle brakes in response to the voltages delivered by these conductors. With the normal or inoperative setting there are eight different combinations possible with these conductor circuits, and accordingly, the brakes can be applied in eight different ways. The relays A, B, and C are energized in different combinations to actuate the respective normally opened switches a, b, and c in the control circuits 13, 14, and 15 respectively to actuate certain of the brakes.

The constant voltage difference between leads 1 and 2 and the voltages indicated for the Zener diodes are illustrative only and are intended as an example of the present invention. The present invention may be practiced with other Zener potentials but these potentials should have substantially the same relationship to each other and to the constant voltage difference as disclosed herein.

It is pointed out that the voltages of the diodes progressively decrease as their distances from the movable contact 6 increase. The voltages of diodes 8, 10, and 12 progressively decrease and the voltages of diodes 9 and 11 similarly decrease. In addition, the Zener diodes 8 and 10 of the preceding intermediate circuits have next lower Zener voltages than those of the Zener diodes 9 and 11 of the next succeeding intermediate circuits. In the drawing, the Zener voltages may be those employed when the constant voltage difference is 24 volts.

Operation of the control system

In its initial condition, the potential movable contact 6 is very close to the low voltage end 4 of the potentiometer 5 so that the difference of potential between conductors 2 and 7 will be only about 2 volts or less. Since this voltage is lower than the voltages of any of the Zener diodes 8–12, none of relays A, B, or C will be energized. Accordingly, the control circuit switches a, b, and c will be opened and none of the control circuits 13, 14, and 15 will be connected to the source of electrical energy. Further, switches a' and b' remain closed. With this combination of connections of the control circuits 13, 14, and 15 with the source of electrical energy 17 (i.e. none of the control circuits are energized) the brake setting corresponds to a release or disengaged position.

The movable contact 6 is then moved toward the high voltage end 3 of the potentiometer 5 until the difference of potential between conductors 2 and 7 is more than 2 volts but less than 5.5 volts. As a result, relay C will be energized through the Zener diode 12 and will actuate switch c to the closed position. Control circuit 15 will thus be connected with the source of electrical energy 17. The connection of control ciruit 15 only with the soure of electricity will constitute the first stage in the application of the brakes.

Upon further shifting of movable contact 6 toward high voltage end 3 of the potentiometer, the difference of potential between the conductors 2 and 7 is increased to above 5.5 volts but below 9 volts. The relay B will then be energized through the closed switch contact a' and the Zener diode 10 to actuate contact switch b to the closed position and to open switch b'. The Zener diode 11 will then control the energization and de-energization of relay C. Thus, relay C will be de-energized and contact c opened to disconnect control circuit 15 from the source of electricity 17. Control circuit 14, however, remains connected to source 17 through closed switch b. This switch setting or combination of control circuits 13, 14, and 15 wherein only circuit 14 is energized, represents the second stage of brake application.

The further shifting of movable contact 6 toward high potential end 3 will increase the difference of potential between conductors 2 and 7 to above 9 volts but below 12.5 volts. Accordingly, relay C will be energized through Zener diodes 11 and 12 while Zener diode 8 prevents relay A from becoming energized. Since relay B remains energized, both control circuit 14 and 15 will be connected to source 17 and will represent the third stage of brake application.

When further shifting of movable contact increases the potential difference between conductors 2 and 7 to above 12.5 volts, but below 16 volts, relay A will become energized and will close switch a and open switch a'. Zener diodes 9 and 10 will prevent relay B from becoming energized and Zener diodes 9 and 12 will prevent relay C from being energized. As a result, current will only flow through control circuit 13 and the energization of control circuit 13 only will represent the fourth braking stage.

When the potential difference between wires 2 and 7 is increased to between 16 and 19.5 volts by movement of the slider 6 as described above, relay C will also be energized, in addition to relay A, and will close the switch contact c. Accordingly, control circuits 13 and 15 will be energized and this combination of the control circuits wherein circuits 13 and 15 are connected to the source 17 will represent the fifth braking stage.

Similarly, increasing the voltage between conductors 2 and 7 to between 19.5 and 23 volts, relay B will become energized in addition to relay A. The energization of relay B will close switch contact b and will open switch contact b'. Zener diodes 9, 11, and 12 will thus prevent the energization of relay C and switch contact c will become opened to disconnect control circuit 15 from source 17. Therefore, control circuits 13 and 14, only, will be energized and this combniation of control circuits will be the sixth braking stage.

When the voltage between conductors 2 and 7 is increased to above 23 volts, the relay C will again be energized to close contact c. Thus, all three control circuits 13, 14, and 15 would be energized and would constitute the seventh and strongest application of the brakes.

The foregoing operation has been described in connection with the application of brakes proceeding from the disengaged or released position to the strongest application. However, in the event the sliding contact 6 of the potentiometer was moved in the reverse direction toward the low votlage end 4, the above-described combinations of control circuits 13, 14, and 15 would be established in the reverse order. This would be the order in which the brakes would be progressively released or disengaged.

Thus it can be seen that the control system according to the present invention provides a simple yet effective switching arrangement for connecting various combinations of control circuits to a source of electrical energy for a progressive application or release of vehicle brakes. The use of electroresponsive valve means in the form of Zener diodes having a particular voltage relationship to each other together with the use of relay actuated switch contacts provides a dependable arrangement for the application of vehicle brakes. It is pointed out that the movable slide contact 6 of the potentiometer may be connected to the braking controller which is generally manually manipulated by the operator of the vehicle.

It will be understood that this invention is susceptible to modification in order to adapt it to different usages and conditions, and accordingly, it is desired to comprehend such modification within this invention as may fall within the scope of the appended claims.

What is claimed is:

1. In a control system for electropneumatic braking, the combination of a plurality of control conductors connected to a voltage source and to brake operators to actuate said operators in selected combinations to establish brake settings, a normally opened switch in each of said control conductors so that closure of a switch energizes the respective control conductor, a potentiometer connected across a source of constant voltage difference and having a low voltage end and a movable contact, a corresponding plurality of intermediate circuits connected to said movable contact, said intermediate circuits each having a relay therein with each relay actuating a control conductor switch, the first of said intermediate circuits also having electro-responsive valve means in series with said relay and subsequent intermediate circuits having a progressively increasing number of series connected electro-responsive valve means therein, the voltage levels of said valve means decreasing progressively from the low voltage end of said potentiometer so that a valve means in one intermediate circuit has a voltage level next below that of a valve means which is common to subsequent intermediate circuits, and a normally closed switch responsive to a relay in the intermediate circuit closest to said potentiometer connected across each of the valve means common to subsequent intermediate circuits.

2. In a control system for electropneumatic braking as claimed in claim 1 with there being three control conductors, said intermediate circuits comprising a first intermediate circuit having a first electro-responsive valve means and a first relay in series therein, a second intermediate circuit having in series second and third electro-responsive valve means and a second relay, a third intermediate circuit having in series said second electro-responsive valve means together with fourth and fifth electro-responsive valve means and a third relay, the voltage responsive levels of said valve means decreasing from the low voltage end of said potentiometer and the voltage levels of said first valve means being less than the level of said second valve means and the voltage level of said third valve means being less than said fourth valve means, there being first and second normally closed switches connected across said second and fourth valve means and responsive to said first and second relays respectively.

3. In a control system for electropneumatic braking as claimed in claim 1 wherein said electro-responsive valve means comprise Zener diodes.

References Cited

UNITED STATES PATENTS

| | | | |
|---|---|---|---|
| 3,134,052 | 5/1964 | LeCronier et al. | 317—137 X |
| 3,302,070 | 1/1967 | Burley | 317—137 |
| 3,339,120 | 8/1967 | McGrath et al. | |

LEE T. HIX, Primary Examiner

U.S. Cl. X.R.

303—20